United States Patent Office 3,110,574
Patented Nov. 12, 1963

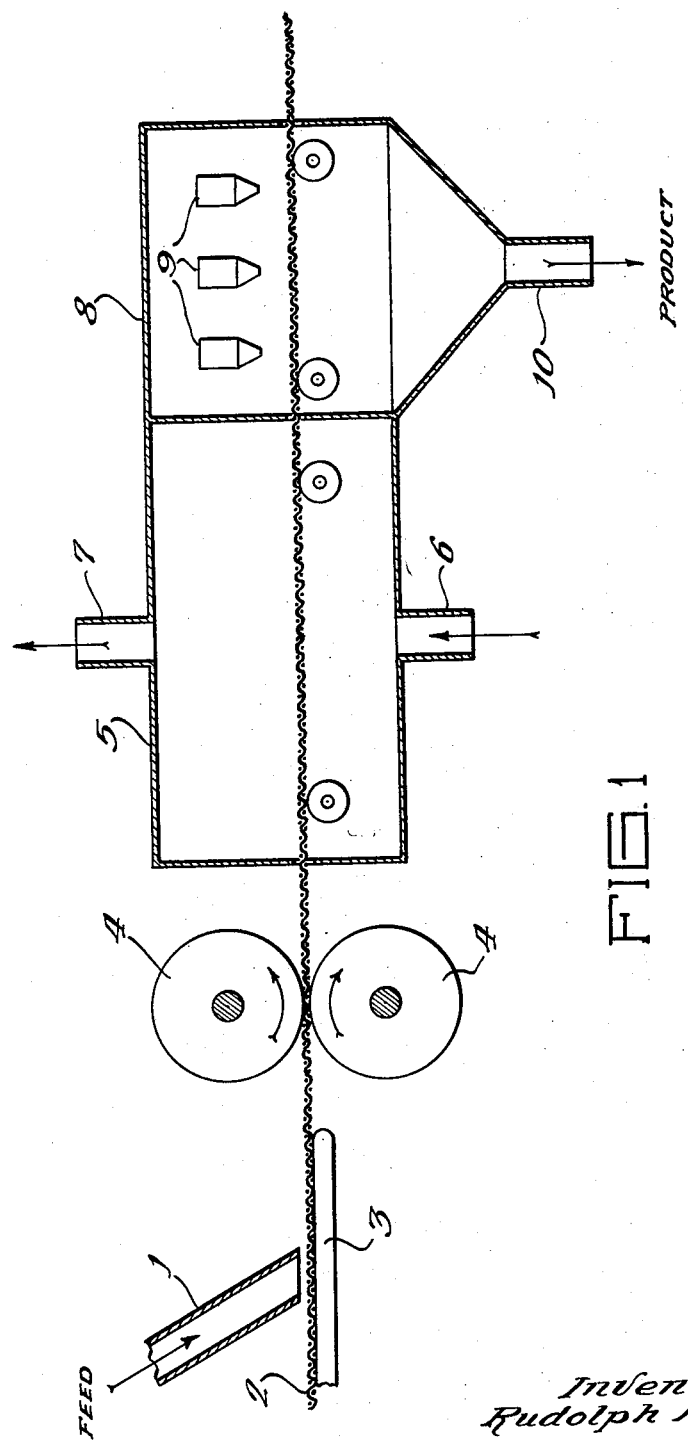

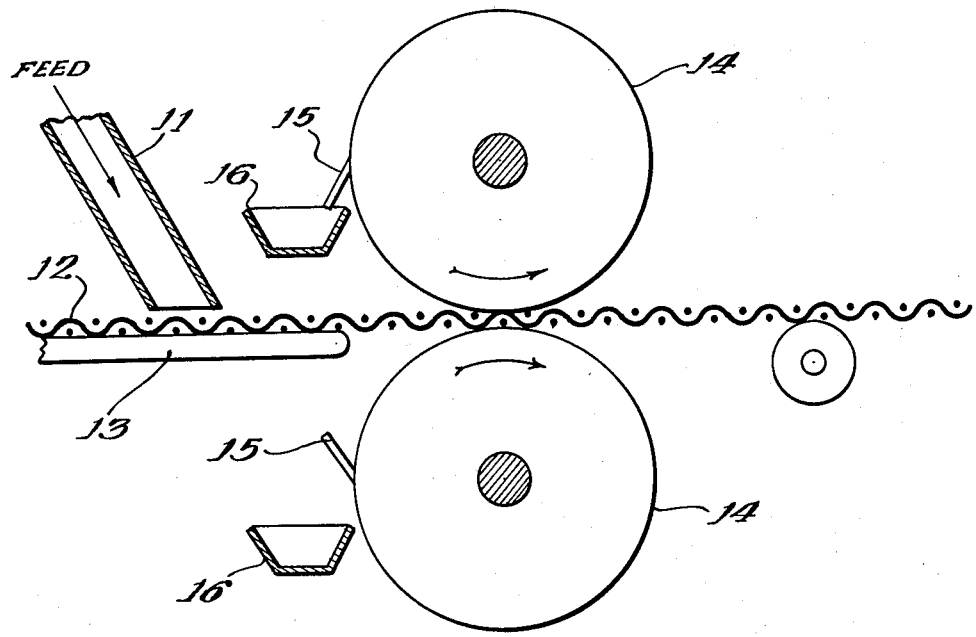

3,110,574
PROCESS OF DEHYDRATING POTATOES
Rudolph Kodras, Skokie, Ill., assignor to International Minerals & Chemical Corporation, a corporation of New York
Filed June 26, 1958, Ser. No. 744,648
2 Claims. (Cl. 34—39)

This invention relates to the dehydration of potatoes. More particularly, it relates to a dehydrated potato product and to a method for the preparation thereof, said product being of high bulk density and being readily rehydrated to form a mashed potato product of superior properties.

The development of dehydrated mashed potato products has been extensively investigated in the art, and three general types of products have been developed, these products being granules, shreds, and flakes. All of these products, however, have heretofore been deficient to some extent in taste, texture, color, stability, and/or bulk density, and for this reason the sales of such materials have so far amounted to only about 1.5% of the total annual potato crop. There is nevertheless a continuing demand for a dehydrated potato product which can be readily reconstituted into a high-quality mashed potato dish, and it is toward the production of such a product that the present invention is primarily aimed.

One object of the present invention is to produce a superior dehydrated mashed potato product.

Another object is to improve the bulk density of dehydrated mashed potatoes.

Another object is to improve the ease of rehydrating dehydrated mashed potatoes.

Another object is to provide a simplified process for producing dehydrated mashed potatoes.

Other objects of the invention will be apparent from the following description and claims.

In one embodiment of the present invention, freshly cooked potato is spread into the interstices of a screen, and is dried therein at moderate temperature. The dried product is readily removed from the screen by an air blast. The completed product is crumb-like in form, light in color, high in bulk density, and readily reconstituted with water and/or milk to form a superior mashed potato product.

Cooked potatoes for use in the present invention can be prepared in any convenient way, as described in the art. In a preferred technique, the potatoes are washed, peeled, sliced to a thickness of around one-half inch, rinsed free of non-adherent starch, and cooked in live steam or boiling water for around 35 minutes. The resulting cooked slices can be used as such, or can be mashed in a portion of the cooking liquor in any convenient manner to produce a pulp or mash containing between about 5 and about 25% by weight of dry solids, preferably between about 10 and about 15%.

In another embodiment of the invention, cooked potato or a mash thereof is fed onto the top of a continuously moving wire screen having a thickness between about $\frac{1}{32}$ and about $\frac{1}{4}$ inch, preferably about $\frac{1}{16}$ inch, with void spaces ranging in area between about $\frac{1}{32}$ and about $\frac{1}{4}$ inch square, preferably around $\frac{1}{16}$ inch square. The potatoes are fed upon the screen as the latter moves across a flat, smooth surface, and are spread and forced into the interstices of the screen by a properly placed scraper blade. The screen then moves into a drying chamber, where a current of dry air rapidly removes the moisture from the potato. The temperature of the air stream is preferably around 150 to 250° F., but lower temperatures may be employed (e.g., as low as around 75° F.), and higher temperatures (e.g., up to about 300° F.) may also be employed, so long as burning and case hardening are avoided. The drying time will of course depend upon the relative humidity of the drying air, the drying temperature, and the water content of the potato composition. In general, a drying time between about 20 and about 40 minutes at around 175° F. and a relative humidity around 50% will be sufficient. It is advantageous to dry first at a relatively low temperature (e.g., from about 75 to about 125° F.) to a solids content above about 50%, then complete the drying at 150 to 250° F. The preliminary drying may be conducted at high relative humidity (around 60–80%) if desired to minimize case hardening. The completed product should have a moisture content below 12%, dry basis, preferably between about 5 and about 10%.

The dried potato film on the screen remains loosely adherent thereto, and is readily removed by blowing a stream of air through the screen, by brushing, by mechanically vibrating, or by other means known to the art. The dried potato is obtained thereby in the form of crumb-like granules without damage to the cell structure thereof. Moreover, the product is of high bulk density (around 0.35 gram per cubic centimeter or higher), and is readily rehydrated simply by stirring into water.

In another embodiment of the invention, a continuous screen is passed between a pair of heated drums rotating in opposite directions. A potato mash is applied to the screen just prior to the point at which the screen passes between the drums, and the mash is squeezed thereby into the interstices of the screen. When the screen emerges from between the drums, the potato mash adheres to the drums and is removed thereby from the screen. In this way, the mash is divided into small crumb-like granules, which are dried rapidly as the drums continue to revolve. The dried granules are removed from the drums by suitably placed doctor blades.

In a further embodiment of the invention, a potato mash is squeezed into the interstices of a continuous screen passing between a pair of drums rotating in opposite directions. In order to overcome the tendency of the potato mash to adhere to the surface of the drums, rather than to remain in the screen, the drums are carefully spaced to avoid friction with the screen, and are rotated at a peripheral velocity slightly greater than the velocity of the screen—e.g., from about 5 to about 10% greater. The resulting slippage between the drum and the potato mash minimizes adherence of the latter to the drum, and permits the paste to remain largely in the screen, where it is subsequently dried.

It will be apparent that numerous types of apparatus can be employed to carry out the process of the present invention. A simple device comprises a continuous screen moving past a loading station through a drying chamber to an unloading station, where the dried particles are removed by an air blast, after which the screen returns to the loading station. Alternatively, by employing a suitably thin potato paste, it is possible to use a drum-type filter, in which the potato paste is first picked up by the rotating filter drum, is spread thereon by a scraper blade, dried by application of a gentle current of hot air, and finally blown away from the screen by application of an internal blast of air. A suitable filter of this type is the so-called "Bird-Young" rotary filter, described in Perry's Chemical Engineers' Handbook, Third Edition, pages 982 and 983.

FIGURES 1 and 2 are schematic representations of the process of this invention.

In FIGURE 1, cooked potatoes or a potato mash is fed through conduit 1 onto screen 2 which moves across a flat surface 3. The potatoes are squeezed into the screen by rotating drums 4. Drums 4 will rotate at a peripheral speed greater than the linear speed of the screen passing therethrough. The screen 2, carrying the potatoes in the interstices, then moves into drying chamber 5 wherein the potatoes are contacted with hot gases which may enter at inlet 6 and exit at outlet 7 from the drying chamber. Subsequently, the screen, now carrying dry potatoes, moves into removal chamber 8 where it is contacted by one or more air streams from nozzles 9 to remove the crumb product which exits through conduit 10. It will be apparent that the screen employed can be a continuous screen that returns to the loading station 1. It will also be apparent that a plurality of drying chambers may be employed and that the potatoes may be removed from the screen by brushes.

In FIGURE 2, cooked potatoes or a potato mash is fed through conduit 11 onto screen 12 which moves across a flat surface 13. The screen carrying the potatoes then passes through rotating heated drums 14. The potatoes are broken up and squeezed into the interstices of the screen. The heated drums 14 rotate at a peripheral speed substantially equal to the linear speed of the screen and the potato particles adhere to the drums as the screen emerges from between the drums. The granules deposited in substantially discrete form on the surface of drums 14 are dried as the drums continue their rotation. The dried particles are removed from the drum by doctor blades 15 and are collected in collecting means 16, e.g. troughs. Again, variations of the process will be apparent to those skilled in the art.

The following specific examples will more clearly illustrate the invention.

*Example 1*

Idaho russet potatoes were washed, peeled, trimmed and sliced to around one-half inch thickness, again washed, and cooked with live steam at atmospheric pressure for 35 minutes. For the drying operation, an apparatus was employed comprising a 14 x 18 mesh per inch aluminum screen passing downward at the rate of 2 feet per minute between a pair of drums rotating in opposite directions. The drums had a diameter of 6⅛ inches, and were heated to a surface temperature of about 285° F. by pressurized steam therein.

The cooked potato slices were dropped upon the moving screen just before the screen passed between the drums. They were broken up and squeezed thereby into the interstices of the screen. As the screen emerged from between the drums, the potato granules adhered to the drums and were thereby removed essentially completely from the screen. The granules were dried on the drums as rotation continued, and were scraped from the drums by a doctor blade, positioned at a point 227 degrees in the direction of rotation from the point of contact of the screen with the drums. The resulting product had a bulk density of 0.4 gram per cubic centimeter. The product was readily rehydrated simply by stirring with water, and the resulting mashed potato was of good texture and flavor.

*Example 2*

A plastic screen having 1/16-inch square openings was filled with a mash of cooked potato by spreading the mash across the screen on a flat surface, then removing the excess. Small rectangular particles were obtained in this way, suspended in the plastic fibers. The screen loading was 0.11 lb./ft.$^2$. The prepared screen was placed in a drier in line with a flow of air heated to 130° F. for 3 minutes, then 180° F. for 20 minutes. The dry product separated readily from the screen and was found to have a bulk density of 0.35 gram per cubic centimeter. It was readily rehydrated to form a superior mashed potato product.

*Example 3*

A galvanized iron screen having ⅛-inch square openings was similarly filled with potato mash and dried at 130° F. for 24 hours. The product had a bulk density of 0.31 gram per cubic centimeter, and on being rehydrated it gave a mashed potato composition of excellent texture.

While the invention has been described with reference to certain specific details, it is to be understood that such matters are illustrative only, and not by way of limitation. Numerous modifications and equivalents of the invention will be apparent from the foregoing description to those skilled in the art.

The following claims particularly specify and distinctly claim the subject matter of the present invention:

1. A method for drying cooked potatoes which comprises squeezing cooked potatoes into the interstices of a screen, passing said screen between drums rotating in opposite directions at peripheral speeds approximating the velocity of the screen, whereby the resulting potato granules adhere to the drums and are removed thereby from the screen, drying the resulting granules while adherent to the drums, and removing the dried granules.

2. A method for drying cooked potatoes which comprises squeezing cooked potatoes into the interstices of a screen, passing said screen between a pair of drums rotating in opposite directions at peripheral speeds slightly greater than the velocity of the screen, whereby the potato granules are retained within the interstices of the screen, drying the potato granules therein, and removing the dried granules therefrom.

References Cited in the file of this patent

UNITED STATES PATENTS

| | | |
|---|---|---|
| 1,025,373 | Cooke | May 7, 1912 |
| 1,250,427 | Campbell | Dec. 18, 1917 |
| 1,295,162 | Heimerdinger | Feb. 25, 1919 |
| 1,301,532 | Allen | Apr. 22, 1919 |
| 1,530,439 | Testrup et al. | Mar. 17, 1925 |
| 1,596,213 | Nishina | Aug. 17, 1926 |
| 2,346,500 | Moore | Apr. 11, 1944 |
| 2,413,735 | Shabaker | Jan. 7, 1947 |
| 2,523,552 | Birdseye | Sept. 26, 1950 |
| 2,541,109 | Shabaker | Feb. 13, 1951 |

FOREIGN PATENTS

| | | |
|---|---|---|
| 117,175 | Germany | Jan. 31, 1901 |
| 589,830 | Great Britain | July 1, 1947 |
| 624,812 | Great Britain | June 16, 1949 |